United States Patent
Tokimatsu et al.

(10) Patent No.: US 6,253,870 B1
(45) Date of Patent: *Jul. 3, 2001

(54) METHODS FOR MEASUREMENT, ANALYSIS AND ASSESSMENT OF GROUND STRUCTURE

(75) Inventors: Koji Tokimatsu, 2-3-2 Deiki, Kanazawa-ku, Yokohama-shi, Kanagawa; Shinichi Kuwayama, Chiba, both of (JP)

(73) Assignees: Koji Tokimatsu, Kanagawa; Sadao Yabuuchi, Hyogo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/887,686

(22) Filed: Jul. 3, 1997

Related U.S. Application Data (63) Continuation of application No. 08/573,914, filed on Dec. 18, 1995, now abandoned, which is a continuation of application No. 08/340,965, filed on Nov. 17, 1994, now abandoned, which is a continuation of application No. 08/210,120, filed on Mar. 16, 1994, now abandoned, which is a continuation of application No. 07/686,216, filed on Apr. 16, 1991, now abandoned.

(30) Foreign Application Priority Data

Apr. 28, 1990 (JP) .................................................. 2-112221

(51) Int. Cl.[7] ........................................................ G01V 1/16
(52) U.S. Cl. .......................... 181/122; 367/38; 367/48; 367/40; 367/54
(58) Field of Search .................................. 181/122, 112; 367/38, 48, 40, 54

(56) References Cited

U.S. PATENT DOCUMENTS

| | | | |
|---|---|---|---|
| 3,344,881 | 10/1967 | White ................................. | 367/49 |
| 3,812,457 | * 5/1974 | Weller ................................ | 367/36 |
| 3,893,066 | 7/1975 | Saunders ............................ | 367/49 |
| 4,403,312 | * 9/1983 | Thomason .......................... | 367/56 |
| 4,554,648 | 11/1985 | Greer et al. ........................ | 367/49 |
| 4,935,905 | * 6/1990 | Gassaway ........................... | 367/59 |
| 5,010,976 | * 4/1991 | Airhart .............................. | 181/108 |
| 5,029,145 | * 7/1991 | Marsden et al. .................. | 367/56 |

FOREIGN PATENT DOCUMENTS

| | | |
|---|---|---|
| 04500 | 5/1989 | (DE) . |
| 705398 | 12/1979 | (SU) . |
| 1000971 | 2/1983 | (SU) . |
| 1022090 | 6/1983 | (SU) . |
| 1589230 | 8/1990 | (SU) . |

OTHER PUBLICATIONS

Conference Record, vol. 1, pp. 843–847, Twenty–Second Asilomar Conference on Signals, Systems & Computers, Pacific Grove, California.

* cited by examiner

Primary Examiner—J. Woodrow Eldred
(74) Attorney, Agent, or Firm—Jordan and Hamburg LLP (57) ABSTRACT

For determination of the laminar structure and other characteristics of a ground, oscillation sensors for detecting the vertical component or vertical and horizontal components of oscillations are disposed at three or more points within a comparatively small area at ground level to simultaneously measure microseisms at the respective points, if necessary with locations of said points being varied and measurements be performed at the respective locations and the vertical oscillation data or vertical and horizontal oscillation data thus generated are analyzed. This method not only permits an expedient, positive and accurate assessment of the laminar structure and other characteristics of the ground but also permits the measurement of ground structure even when the area available for measurement is small.

12 Claims, 7 Drawing Sheets

METHODS FOR MEASUREMENT, ANALYSIS AND ASSESSMENT OF GROUND STRUCTURE

This application is a continuation, of application Ser. No. 08/573,914 filed Dec. 18, 1995, now abandoned, which is a continuation of application Ser. No. 08/340,965 filed Nov. 17, 1994, now abandoned which is continuation of application Ser. No. 08/210,120 filed Mar. 16, 1994, now abandoned, which is a continuation of application Ser. No. 07/686,216 filed Apr. 16, 1994 now abandoned.

BACKGROUND OF THE INVENTION

1. Technical Field

The present invention relates to methods for measurement, analysis and assessment of ground structure.

2. Background Art

To determine the structure and characteristics of the surface layer of the ground, it has heretofore been necessary to drill a plurality of holes in the ground and insert or indwell instruments and ancillary devices into the holes and also to employ a source of oscillation for generating waves to be measured. It should, therefore, be obviously of great benefit if it were ever possible to know the structure and characteristics of the surface layer of the ground without any of such efforts and contrivances. To this end, it might be contemplated to measure and analyze the oscillatory waves or microseisms observed in the surface layer of the ground. However, up to the present time, there is not known a measuring technology or a system of instrumental analysis, by means of which short-period microseisms could be measured with sufficient accuracy to estimate the tectonic and other characteristics of the surface layer of the ground inclusive of the velocity of shear (S) waves.

Furthermore, the prior art system designed to simultaneously measure short-period microseisms at a plurality of points to thereby delineate the ground structure has the following disadvantages.

A. Since the spacings of oscillation sensors must be large, that is to say the scale of measurement must be large, a large free area is required and it is time-consuming to connect the cords from the respective oscillation sensors for cental analysis. Moreover, because the large number of oscillation sensors are required, the analytical procedure is scaled up to the extent that the method cannot be utilized advantageously in the field.

B. Since the network of oscillation sensors is not tailored to improvement in measuring accuracy or resolution of high-order modes, the reliability of the measured dispersion curve is low.

C. Short-period microseisms include not only substantive waves such as dilatational (P-) waves and S-waves but surface waves such as Rayleigh and Love waves. Since the confirmation or judgement of whether the detected waves are surface waves or not is not performed at measurement or analysis, it is impossible to judge whether the dispersion curve obtained is relevant to the surface waves and, hence, to accurately determine the ground structure.

D. Since short-period waves include higher-modes surface waves, it is impossible to compute an accurate surface wave dispersion curve and, hence, to ascertain the surface layer structure of the ground unless some means for removing or separating these waves are available.

E. Since the dispersion curve cannot be computed real-time from field values, there is no knowing whether measurements were made with acceptable accuracy.

OBJECT OF THE INVENTION

It is an object of the present invention to provide a method for measurement, analysis and assessment of ground structure whereby the laminar structure and characteristics of the ground can be determined quickly, expediently and accurately through simultaneous ground-level observation and analysis of short-period microseisms even in a confined available land.

It is another object of the present invention to provide a method for measurement, analysis and assessment of ground structure which does not call for drilling of holes or the use of an oscillation source.

It is a further object of the invention to provide a method for measurement, analysis and assessment of ground structure in which the accuracy of measurement and analysis has been improved by using a network of substantially equi-spaced oscillation sensors which facilitates field sensor positioning as well.

It is another object of the present invention to provide a method for measurement, analysis and assessment of ground structure by which the laminar structure and characteristics of the ground can be ascertained with accuracy through selective extraction of surface waves.

It is still another object of the present invention to provide a method for measurement, analysis and assessment of ground structure by which the accuracy of assessment of the ground structure can be improved by a collective analysis of data obtained by repeated measurement using dissimilar sensor-to-sensor distances.

It is still another object of the present invention to provide a method for measurement, analysis and assessment of ground structure by which the laminar structure and characteristics of the ground can be evaluated conveniently and accurately on a real-time basis.

SUMMARY OF THE INVENTION

The present invention is predicated on the facts that when surface waves such as Rayleigh waves are propagated through a horizontal multi-layer ground structure, phase velocity (the velocity of propagation) varies with different wavelengths (dispersions), that the apparent phase velocity can be computed by averaging the correlation coefficients of the waveforms measured by equi-spaced oscillation sensors in different directions, that this apparent phase velocity varies with different sensor-to-sensor differences due to the influence of higher-order modes, and that when the horizontal and vertical components of the motion of a particle on the ground surface due to propagation of oscillations are detected and synthesized, the locus of rotation or orbit of a particle on the ground surface can be constructed, and that such surface waves are present in short-period microseisms as well. As such, the present invention is directed to a method for measurement, analysis and assessment of surface wave dispersion curves which serve as bases for evaluation of the tetonic and elastic characteristics of the ground by repeated simultaneous measurement of short-period microseisms at a plurality of points in a simple small-scale measuring system wherein 3 or more oscillation sensors are disposed at substantially equal sensor-to-sensor distances within a comparatively small area and inverse analysis of the surface wave dispersion curves at the points of measurement to compute the S- wave velocity of the ground and evaluate the laminar structure and features of the ground.

In the first aspect, the present invention provides a method for estimating the laminar structure and characteristics of a ground which comprises disposing an oscillation sensor adapted to detect the vertical component or the vertical and horizontal components of oscillations at each of at least 3 points within a comparatively narrow area and thereby measuring microseisms at such plural points simultaneously, if necessary changing the points of measurement and repeating the measurement, and analyzing the vertical oscillation data or vertical and horizontal oscillation data.

In the second aspect, the present invention is directed to a method for estimating the laminar structure and characteristics of a ground according to said first aspect wherein said microseisms to be measured are short-period microseisms observed at ground level.

In the third aspect, the present invention is directed to a method according to said first aspect wherein two oscillation sensors are disposed on each of 2 or more straight lines passing through the ground to be measured and dividing the azimuth of 360 degrees into an even-number of sections or straight lines paralleled thereto in such a manner that all sensorto-sensor-distances are equal on each of said straight lines.

In the fourth aspect, the present invention provides a method according to said first aspect wherein said oscillation sensors are disposed at 3 or more points with equal spacings on the circumference of a circle and at one point in the center of the circle, or at a total of at least 4 points.

In the fifth aspect, the present invention provides a method according to said first aspect wherein said oscillation sensors are disposed at apices of a regular triangle and the center of gravity thereof or a total of 4 points.

In the sixth aspect, the present invention is directed to a method for estimating the laminar structure and characteristics of a ground which comprises analyzing vertical oscillation data or vertical and horizontal oscillation data as measured simultaneously with oscillation sensors, judging whether the oscillation waves detected by said oscillation sensors are surface waves or not, and extracting and analyzing the surface waves.

In the seventh aspect, the present invention is directed to a method for evaluating the laminar structure and characteristics of a ground which comprises analyzing the correlation coefficients and phase differences of oscillation data measured by equi-spaced oscillation sensors at respective frequencies, performing the analysis for each of varying sensor-to-sensor distances, analyzing and computing the fundamental mode of surface waves based on results of the respective analyses and, if necessary, analyzing and completing the higher-mode wavelengths.

In the eighth aspect, the present invention relates to a method for estimating the laminar structure and characteristics of a ground which comprises performing the measurement and analysis of microseisms repeatedly until it can be concluded that a relation between phase velocity and wavelength such as to give a sufficiently accurate evaluation of ground structure can be achieved.

Thus, in accordance with the present invention, oscillation sensors for detecting the vertical component or the vertical and horizontal components of a vibration are disposed at 3 or more points within a comparatively small area at ground level and the microseisms are measured simultaneously at said points, if necessary changing the locations of said points of measurement and the resulting vertical oscillation data or vertical and horizontal oscillation data are analyzed. By measuring microseisms with a small network of oscillation sensors, the accuracy of assessment of the surface structure of the ground can be improved and a system enabling a rapid field measurement, analysis and assessment can be constructed. Therefore, the laminar structure and characteristics of the ground can be estimated expediently, positively and accurately.

Furthermore, the present invention is concerned with short-period microseisms which can be easily measured at ground level and as such does not require drilling and placement of instruments in the drilled holes or the use of an oscillation source so that the measurement and analysis of ground structure can be easily performed in any location.

Moreover, since the network of oscillation sensors for measurement can be set up in a comparatively confined area, the measurement is facilitated and can be performed even in a small plot of land.

In addition, when the vertical and horizontal oscillation data are analyzed and the locus of rotation of a particle on the ground surface due to propagation of oscillations is constructed and the analysis and assessment are carried out on confirming that the measured waves are surface waves, the P and S waves can be differentiated and the surface waves only be positively measured to provide accurate information on the ground structure.

Moreover, when oscillation sensors are disposed in a network wherein sensor-to-sensor distances are substantially equal and the measurement of waves is repeated varying the sensor-to-sensor distances, the high-mode surface waves can be isolated from the fundamental mode, with the result that a highly accurate relation of dispersion wave to wavelength can be obtained. It is because the analytical system is constructed using a microcomputer that the assessment can be obtained on the spot.

Moreover, when it is so arranged that the measurement of microseisms, amplification of detected signals and the analysis and assessment of data are automatically performed as a sequence, the relationship between dispersion curve and wavelength can be more accurately determined in the field.

EFFECTS OF THE INVENTION

In accordance with the present invention, a plurality of oscillation sensors for detecting the vertical component or vertical and horizontal components of oscillations are arranged at 3 or more points in a comparatively small area, the measurements of microseisms at the respective points are simultaneously performed, if necessary varying the locations of said points and repeating the measurements, and the measured vertical oscillation data or vertical and horizontal oscillation data are analyzed to ascertain the laminar structure and characteristics of the ground. Therefore, the laminar structure and other characteristics of the ground can be determined not only expediently, positively and accurately but even when the area available for measurement is confined.

In the second aspect of the present invention wherein said microseisms to be measured are short-period microseisms observed on the surface of the ground, the laminar structure and other characteristics of the ground can be determined without calling for drilling of holes or the use of an oscillation source in addition to realization of the effects achieved by the first aspect of the invention.

According to the third aspect of the invention, two oscillation sensors are arranged on two or more straight lines passing through the ground to be measured and dividing the azimuth of 360 degrees into an even-number sections or straight lines parallel thereto in such a manner that the distance between the oscillation sensors is constant on each of said straight lines, with the result that, in addition to the effects of the first aspect of the invention, the field installation of the oscillation sensors is facilitated and, moreover, because the sensor-to-sensor distance is constant in different directions, the accuracy of measurement and analysis is improved.

Comparable effects are obtained in the fourth and fifth inventions.

In accordance with the sixth aspect of the present invention, the vertical oscillaton data or vertical and horizontal oscillation data measured simultaneously by said oscillation sensors are analyzed to see whether the oscillation waves detected by the oscillation sensors are surface waves or not and the laminar structure and other characteristics of the ground are still more accurately estimated from the accurate dispersion curves constructed by extraction and selective analysis of the surface waves.

In accordance with the seventh aspect of the present invention, the correlation coefficients and phase differences of the oscillation data measured by oscillation sensors disposed at equal spacings for the respective wavelength are analyzed, varying the sensor-to-sensor difference and repeating the measurements and, based on results of the respective analyses, the fundamental mode of the surface waves is analyzed and computed. If necessary the wavelength of the higher mode is analyzed and computed to assess the laminar structure and characteristics of the ground. Therefore, in addition to the effects of the first to the sixth aspect of the invention, the higher mode surface waves which could not be easily isolated in the past can be neatly isolated for insuring a further improvement in the accuracy of assessment of ground structure.

In accordance with the eighth aspect of the invention, the measurement of microseisms and the analysis of measured microseismic data are continued until a relationship between phase velocity and wavelength such that the ground structure can be determined with sufficient accuracy is obtained so that the laminar structure and characteristics of the ground can be determined expediently, rapidly and accurately on a real-time basis.

BRIEF DESCRIPTION OF THE DRAWINGS

FIG. 7 (*a*) through (*d*) are other arrangements of oscillation sensors.

DETAILED DESCRIPTION OF PREFERRED EMBODIMENTS

The preferred embodiments of the present invention are described in detail.

Figure 1:
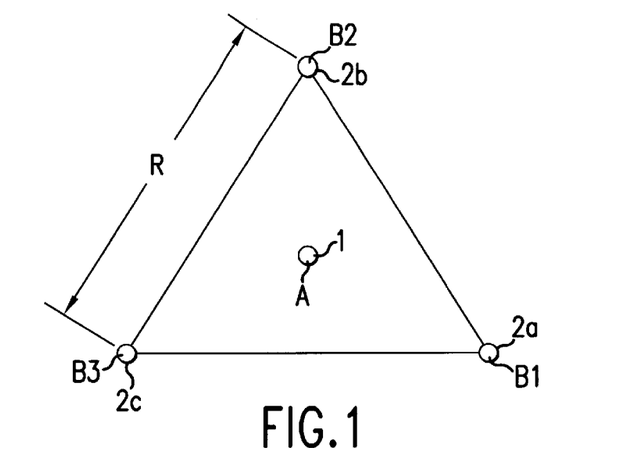
FIG. 1 is a view showing the arrangement of oscillation sensors in an embodiment of the present invention.
Figure 2:
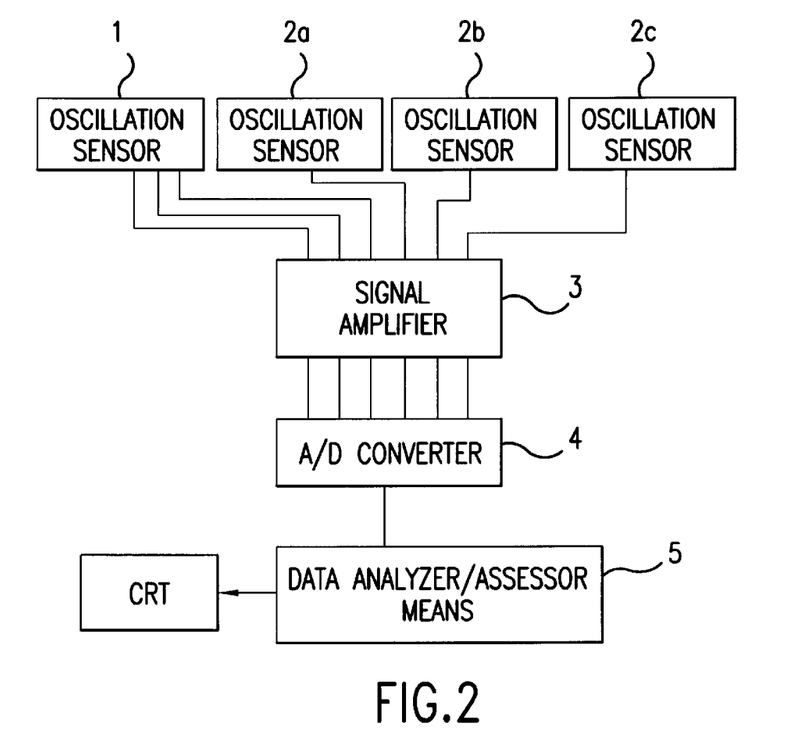
FIG. 2 is a schematic view showing the measurement, analysis and assessment system of the same.

Referring to FIGS. 1 and 2 which illustrate a typical arrangement of oscillation sensors and a schematic representation of the system embodying the principles of the invention, a three-component oscillation sensor 1 for detecting the vertical component of oscillation and the bidirectional horizontal component of oscillation as disposed in one position at ground level and a plurality of vertical-component oscillation sensors 2*a*, 2*b* and 2*c* as disposed at positions corresponding to the apices $B_1$ through $B_3$ of a regular triangle with the length of one side being R and the center of gravity coinciding with said one point A.

The above-mentioned oscillation sensors 1 and 2*a* through 2*c* each comprises a speedometer and a displacement meter. In the above arrangement, the short-period microseisms are simultaneously measured.

The detection signal outputs from the respective oscillation sensors 1 and 2*a* through 2*c* are amplified by a signal amplifier 3 (FIG. 2) and then, fed to a data analyzer-assessor means 5, comprised of a microcomputer, through an A/D converter 4 (interface).

Figure 3:
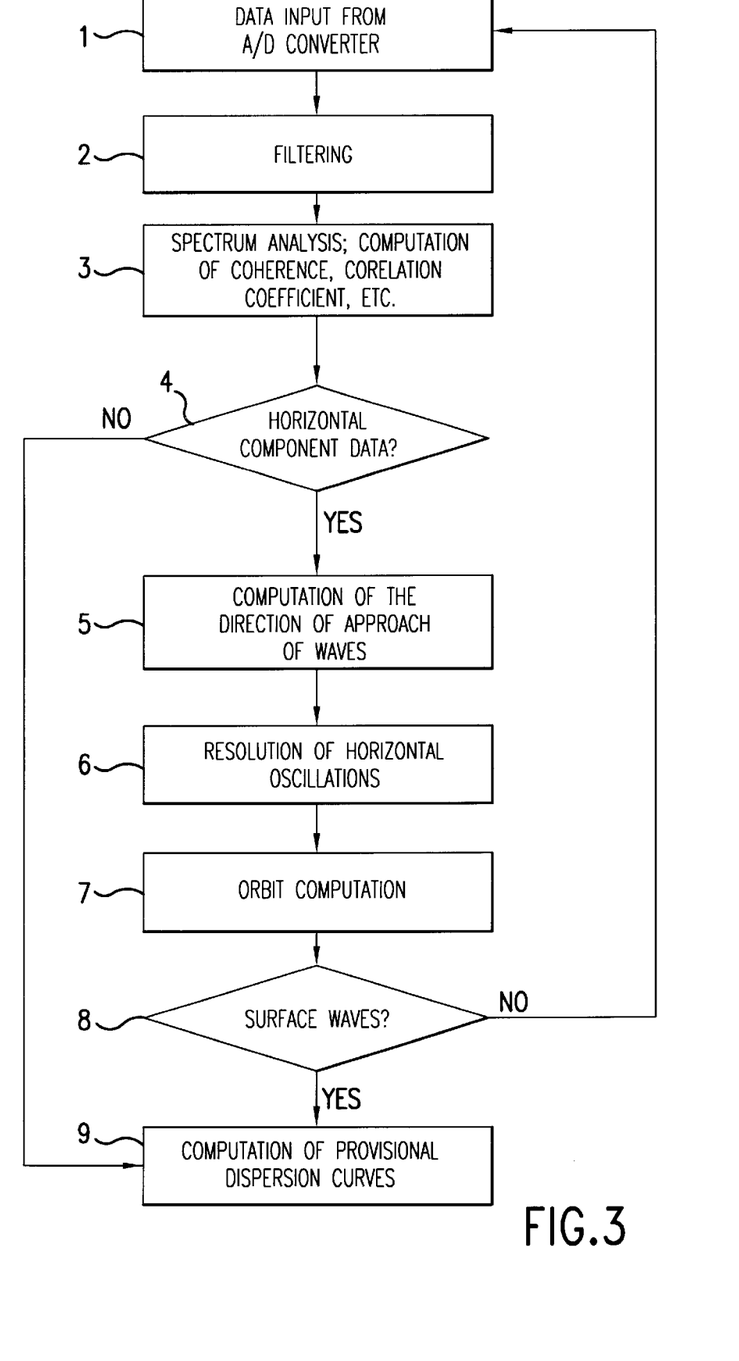
FIGS. 3 and 4 each is a flow chart for illustrating the procedure of said analysis and assessment.

The data analyzer/assessor means 5 analyzes the input data according to the processing flow shown in FIG. 3 to compute provisional dispersion curves and displays the curves on a cathode-ray tube CRT 6.

The measurement, analysis and assessment functions of the system are described in detail below, referring to the flow charts shown in FIGS. 3 and 4.

Referring back to FIG. 1, the vertical and horizontal oscillation detection signal outputs from the oscillation sensors 1 and 2*a* through 2*c* located at points A and $B_1$ through $B_3$ are respectively amplified in the signal amplifier 3 and, after A/D conversion, are fed to said data analyzer/assessor means 5 for data analysis ((1) in FIG. 3).

The oscillation data are filtered ((2), FIG. 3) and subjected to spectrum analysis inclusive of FFT (high-speed Fourier transformation) to determine the coherence, correlation coefficient and phase difference of waves detected by the plural equi-spaced oscillation sensors for each of the frequencies (f) involved (FIG. 3, (3)). When there is horizontal component data (FIG. 3, (4)), the direction of approach of the dominant wave is determined (FIG. 3, (5)), the horizontal component data measured by oscillation sensors 1 and 2*a* through 2*c* are analyzed in a direction perpendicular to the direction of approach of the waves (FIG. 3, (6)), and the movements of the ground surface in the planes parallel and perpendicular to the direction of approach of the waves are determined as the locus of rotation of a particle on the ground surface (FIG. 3, (7)). Then, it is inquired if the predominant seismic wave is a surface wave or not (FIG. 3, (8)). If the answer is affirmative, a provisional dispersion curve (FIG. 3, (9)) is computed for the frequency relevant to the surface wave.

The above series of measurement, analysis and assement is performed with the length of sides of the tringle at the apices of which said oscillation sensors 2*a*, 2*b* and 2*c* are situated being varied from 50 cm to 1 m to 2 m to 5 m and to 10 m or, alternatively, with a plurality of regular triangles varying in the length of sides being laid out and said oscillation sensors are disposed at the apices of each triangle.

Figure 4:
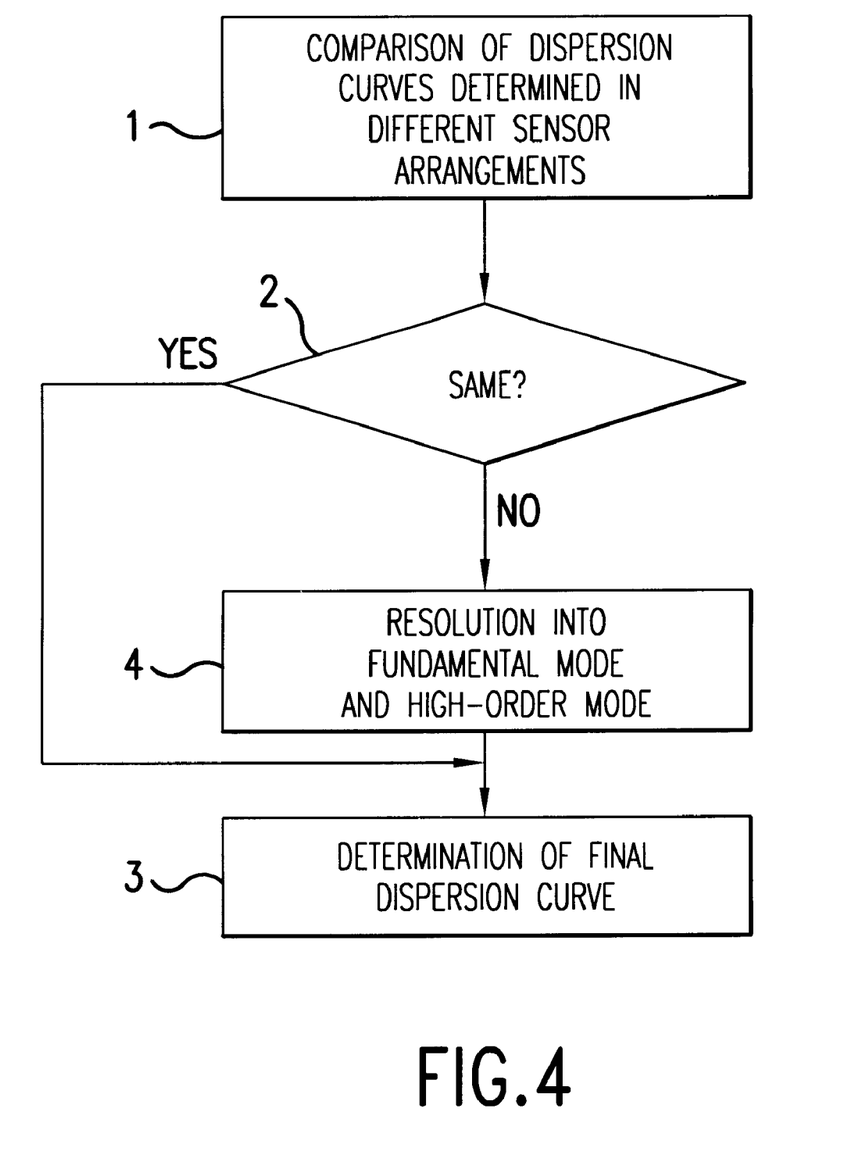

Then, the provisional dispersion curves determined by measurements for regular triangles varying in length of their sides (FIG. 4, (1)–(2)) and if all the provisional dispersion curves are identical, they are taken as the final dispersion curves (3). If they are different, the fundamental mode and the higher-order mode are respectively isolated and the degree of predominance is determined for each frequency (4). Finally the final dispersion curve i s determined.

With respect to the dispersion curve thus determined, inverse analysis based on the theory of elastic wave propagation is carried out to estimate the laminar structure and characteristics of the ground.

Figure 5:
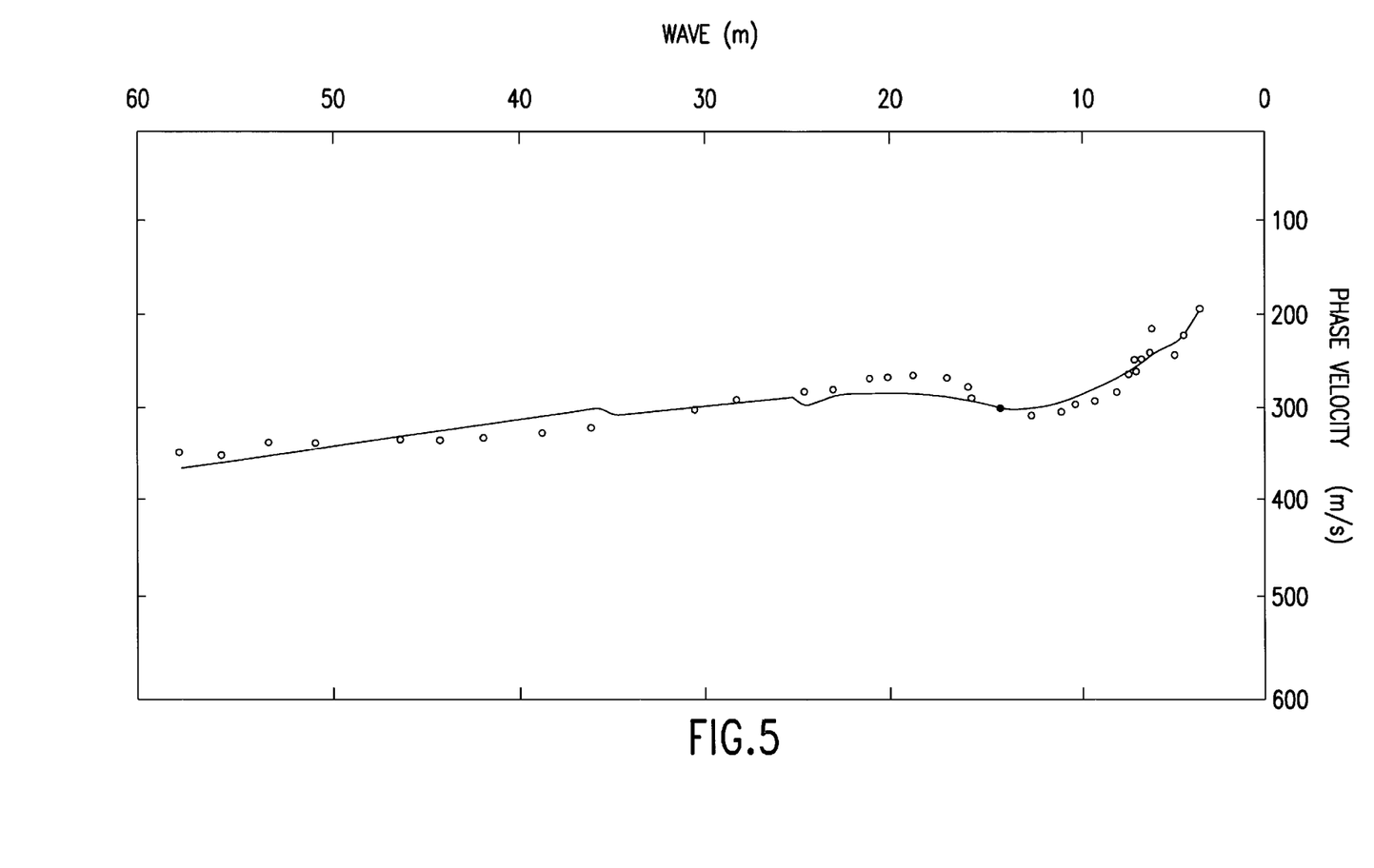
FIG. 5 is a schematic view showing the measured and theoretical dispersion curves.
Figure 6:
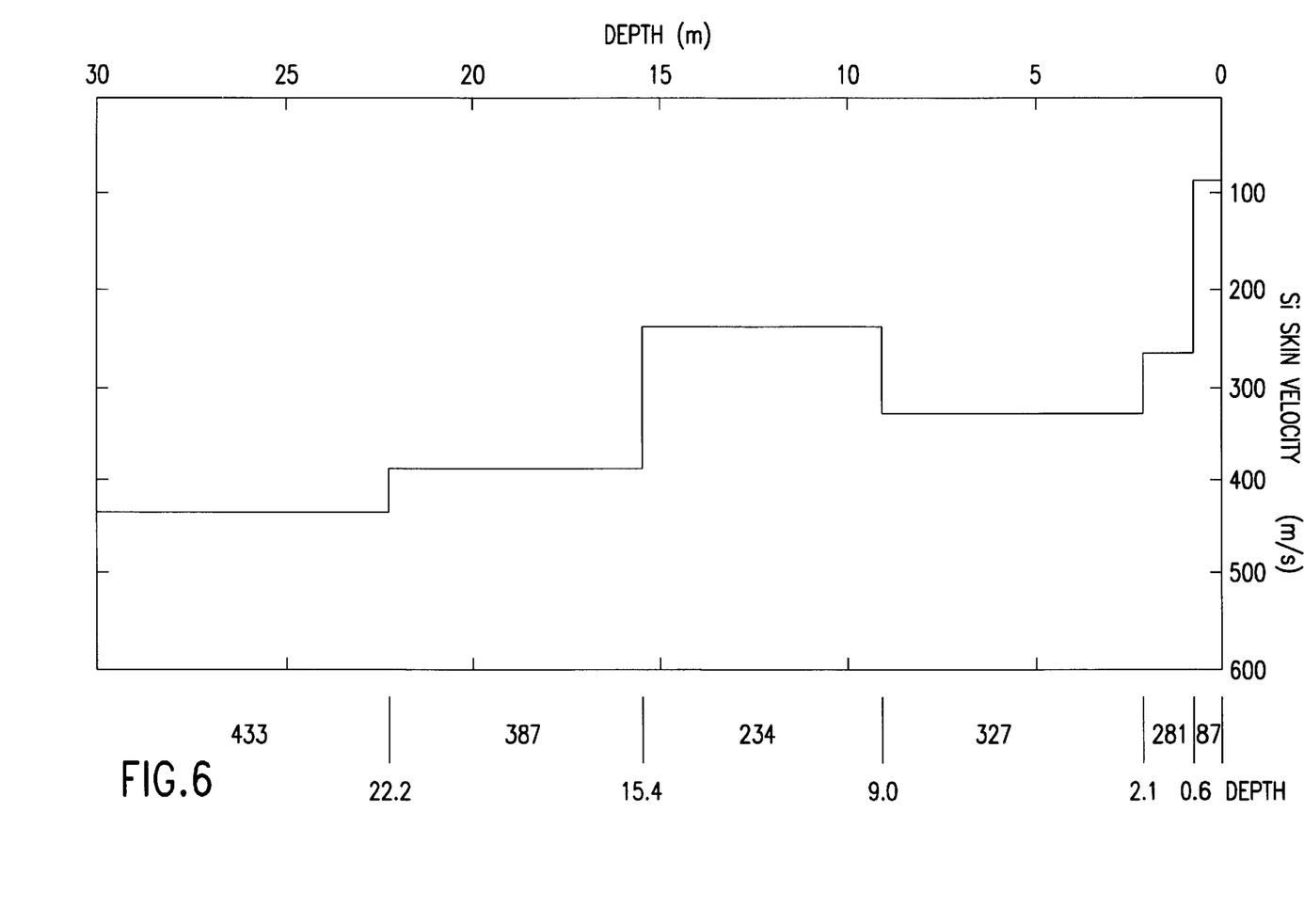
FIG. 6 is a tectonic characteristic diagram obtained by inverse analysis of the same according to the elastic wave propagation theory.
Figure 7A:
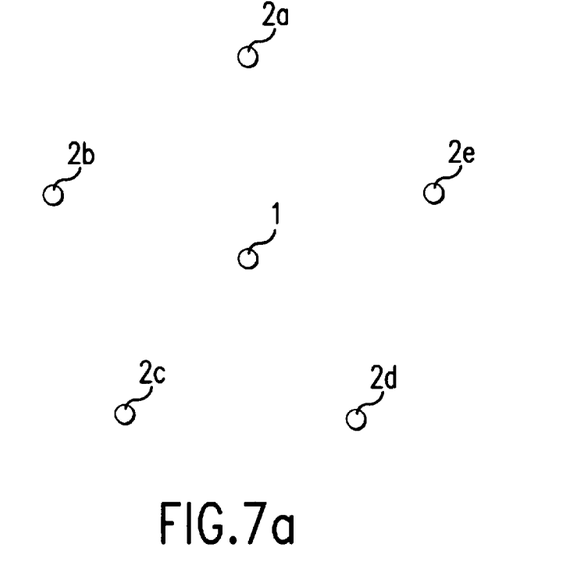
Figure 7B:
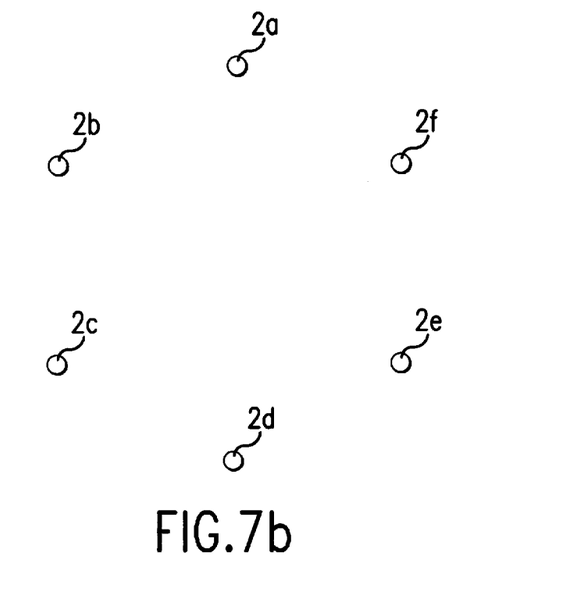
Figure 7C:
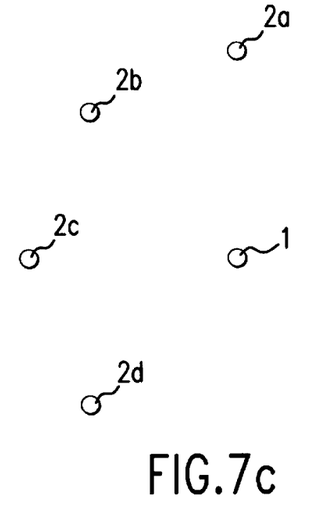
Figure 7D:
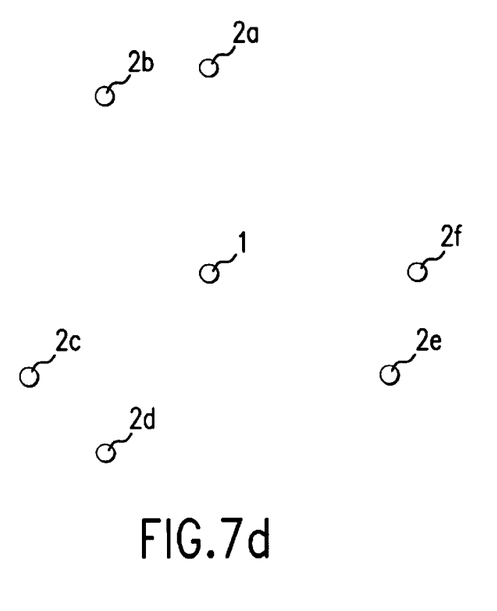

In FIG. 5, the measured dispersion curve is represented by the mark "o" and the ground structure determined by said inverse analysis is shown in FIG. 6. In FIG. 5, the solid line represents the theoretical dispersion curve of the ground, which is well consist tent with the measured values, indicating that the characteristics of the ground can be determined with reliable accuracy.

Now, the measurement of microseisms and the analysis of measured microseisms are automatically continued until it can be judged that the relationship between phase velocity and wavelength which would be conducive to a sufficiently accurate structural determination. In this manner, the laminar structure and characteristics of the ground can be determined expediently and accurately on a real-time basis.

FIG. 7 (a) shows an example of arrangement where oscillation sensors 2a through 2e are disposed at apices of a regular pentagon, with an additional oscillation sensor 1 being disposed at the center of gravity of the pentagon.

FIG. 7 (b) is an example of arrangement in which six oscillation sensors 2a through 2f are disposed at apices of a regular hexagon. In the arrangement illustrated in FIG. 7 (c), oscillation sensors 1 and 2a through 2d are disposed at apices of three equilateral triangles each rotated through 45 degrees and having one of the apices in common. In the arrangement shown in FIG. 7 (d), the circumference of a circle is equally divided into 12 sections and oscillation sensors 1 and 2a through 2f are disposed on 6 of said circumferential sections and in the center of gravity.

In the arrangement of FIG. 1 wherein short-period microseisms are subjects of measurement, the length of one side is about 30 cm at the minimum and about 30 m at the maximum. In contrast, in the arrangements shown in FIG. 7, the minimum length is about 20 cm and the maximum is about 20 m, in terms of the radius of a circle, so that the scale of measurement can be as much smaller.

What is claimed is:

1. A method for estimating the laminar structure of a ground which comprises disposing equi-distant oscillation sensors to detect the vertical and horizontal components of oscillations at each of at least 3 points within a predetermined area at ground level to simultaneously measure microseisms at said at least 3 points, analyzing correlation coefficient and phase difference of oscillation data measured by the equi-spaced oscillation sensors for a plurality of frequencies, performing the analysis repeatedly with sensor-to-sensor distances varied, and analyzing and computing the fundamental mode of surface waves based on results of the respective analyses.

2. A method for estimating the laminar structure of a ground which comprises disposing equi-spaced oscillation sensors to detect the vertical and horizontal components of oscillations at each of at least 3 points within a predetermined area at ground level to simultaneously measure microseisms at said at least 3 points, analyzing correlation coefficient and phase difference of oscillation data measured by said equi-spaced oscillation sensors for a plurality of frequencies, performing the analysis repeatedly with sensor-to-sensor distances varied, analyzing and computing the fundamental mode of surface waves based on results of the respective analyses and analyzing and computing higher-mode wavelengths.

3. A method for estimating the laminar structure of a ground, comprising:

disposing an oscillation sensor adapted to detect a vertical component of oscillations at each of at least three points within a comparatively small area at ground level to simultaneously measure microseisms at said at least three points;

analyzing vertical oscillation data gathered in said step of disposing;

further analyzing correlation coefficient and phase difference of oscillation data measured by oscillation sensors spaced an equal distance apart for a plurality of frequencies;

performing said step of further analyzing repeatedly with sensor-to-sensor distances varied, and analyzing and computing the fundamental mode of surface waves based on results of the respective analyses; and computing an S-wave velocity of the ground, by which the laminar structure of the ground is estimated.

4. A method according to claim 3, wherein said oscillation sensor is adapted to detect a horizontal component in addition to said vertical component of said oscillations to produce horizontal oscillation data.

5. A method according to claim 3, wherein a spacing between sensors is between 50 cm and 10 m.

6. A method according to claim 3, wherein a spacing between sensors is between 20 cm and 30 m.

7. A method according to claim 3, wherein said microseisms measured in said step of disposing include short-period microseisms observed at ground level.

8. A method according to claim 3, further comprising:

disposing a pair of oscillation sensors on each of at least 2 straight lines passing through the ground to be measured; and dividing an azimuth of 360 degrees into an even number of equal sections in such a manner that sensor-to-sensor distances are equal on said straight lines.

9. A method according to claim 3 wherein said oscillation sensors are disposed at 3 or more points at equal spacings on a circumference of a circle and at one point in a center of the circle, for at a total of at least 4 points.

10. A method according to claim 3, wherein said oscillation sensors are disposed at apices of a regular triangle and a geometric center of said triangle, for a total of 4 points.

11. A method according to claim 3, further comprising:

analyzing the vertical oscillation data as measured simultaneously with said oscillation sensors;

judging whether the oscillation waves detected by said oscillation sensors are surface waves or not; and extracting and analyzing the surface waves.

12. A method according to claim 4, further comprising:

analyzing the vertical and horizontal oscillation data as measured simultaneously with said oscillation sensors;

judging whether the oscillation waves detected by said oscillation sensors are surface waves or not; and extracting and analyzing the surface waves.

* * * * *